(12) United States Patent
Kwon et al.

(10) Patent No.: US 7,755,625 B2
(45) Date of Patent: Jul. 13, 2010

(54) APPARATUS AND METHOD FOR RENDERING VOLUME DATA

(75) Inventors: Eui Chul Kwon, Seoul (KR); Byeong Seok Shin, Anyang-si (KR)

(73) Assignee: Medison Co., Ltd., Hongchun-gun (KR)

( * ) Notice: Subject to any disclaimer, the term of this patent is extended or adjusted under 35 U.S.C. 154(b) by 1118 days.

(21) Appl. No.: 11/408,013

(22) Filed: Apr. 21, 2006

(65) Prior Publication Data
US 2006/0250395 A1 Nov. 9, 2006

(30) Foreign Application Priority Data
May 4, 2005 (KR) .................. 10-2005-0037524

(51) Int. Cl.
*G06T 17/00* (2006.01)
(52) U.S. Cl. ............ 345/424; 345/419; 345/426; 345/581; 345/583; 345/589; 382/128; 382/162; 382/298; 600/443
(58) Field of Classification Search ............ 345/419, 345/421–424, 426, 581, 582, 583, 589; 382/131, 382/154, 285; 378/4; 600/407, 443
See application file for complete search history.

(56) References Cited
U.S. PATENT DOCUMENTS

| | | | | |
|---|---|---|---|---|
| 5,570,460 | A * | 10/1996 | Ramanujam | 345/424 |
| 6,102,861 | A * | 8/2000 | Avila et al. | 600/443 |
| 6,262,740 | B1 * | 7/2001 | Lauer et al. | 345/424 |
| 6,483,507 | B2 * | 11/2002 | Osborne et al. | 345/419 |
| 6,999,078 | B1 * | 2/2006 | Akerman et al. | 345/424 |
| 7,379,575 | B2 * | 5/2008 | Ruhrnschopf | 382/128 |
| 7,379,586 | B2 * | 5/2008 | Ohashi et al. | 382/162 |
| 7,590,306 | B2 | 9/2009 | Lal et al. | |

FOREIGN PATENT DOCUMENTS

JP 2005-157664 6/2005

* cited by examiner

*Primary Examiner*—Kimbinh T Nguyen
(74) *Attorney, Agent, or Firm*—Oblon, Spivak, McClelland, Maier & Neustadt, L.L.P.

(57) ABSTRACT

The present invention relates to an apparatus and a method for rendering volume data in an ultrasound diagnostic system. A method for rendering volume data including an object space and an empty space acquired from ultrasound data, comprises the following steps: a) casting a virtual ray from at least one pixel comprising a viewing plane into the volume data; b) sampling voxels of the volume data along the virtual ray in a first sampling interval; c) checking whether a currently sampled voxel corresponds to the object space or the empty space by using opacity based on a voxel value of a sampled voxel; d) at step c), if it is determined that the currently sampled voxel corresponds to the object space, then returning to the previously sampled voxel and sampling voxels in a second sampling interval shorter than the first sampling interval; e) checking whether accumulated opacity calculated based on the sampled voxels along the virtual ray is greater than a critical value; f) at step e), if it is determined that the accumulated opacity is greater than the critical value, then completing the sampling process for the current virtual ray and calculating a rendering value by using the voxel values and the opacity of the sampled voxels; and g) repeating the steps a) to f) until the sampling process for the pixels comprising the viewing plane is completed.

18 Claims, 6 Drawing Sheets

APPARATUS AND METHOD FOR RENDERING VOLUME DATA

FIELD OF THE INVENTION

The present invention generally relates to ultrasound diagnostic systems, and more particularly to an apparatus and a method for rendering volume data in the ultrasound diagnostic system.

BACKGROUND OF THE INVENTION

Generally, an ultrasound diagnostic system transmits an ultrasound signal from the surface of a human body toward a desired portion within a target object. This is so that an ultrasound image of soft tissues or blood flow can be obtained through non-invasive means by using information obtained through ultrasound echo signals.

Compared to other medical imaging systems (e.g., X-ray diagnostic system, X-ray CT scanner, MRI and nuclear medicine diagnostic system), the ultrasound diagnostic system is advantageous since it is small in size and fairly inexpensive. Further, the ultrasound diagnostic system is capable of providing real-time display and is highly safe without any dangerous side effects such as exposure to X-rays, etc. Thus, it is extensively utilized for diagnosing the heart, abdomen and urinary organs, as well as being widely applied in the fields of obstetrics, gynecology, etc.

In particular, a 3D ultrasound diagnostic system acquires 3D ultrasound data (volume data) of a target object by using a probe. The 3D ultrasound diagnostic system is then configured to display a 3D ultrasound image of the target object on a display by converting conical coordinates of the acquired data to Cartesian coordinates suitable for display (scan conversion). The 3D ultrasound image is displayed based on the volume data consisting of 3D scalar values.

More particularly, actual volume data are obtained by sampling values corresponding to discrete locations in a continuous 3D space of a target object. Unit volume data comprising the sampled volume data are referred to as voxel. The data existing in the continuous 3D space should be sampled in a constant interval in order to store the data by reducing the amount of the data.

Figure 1:
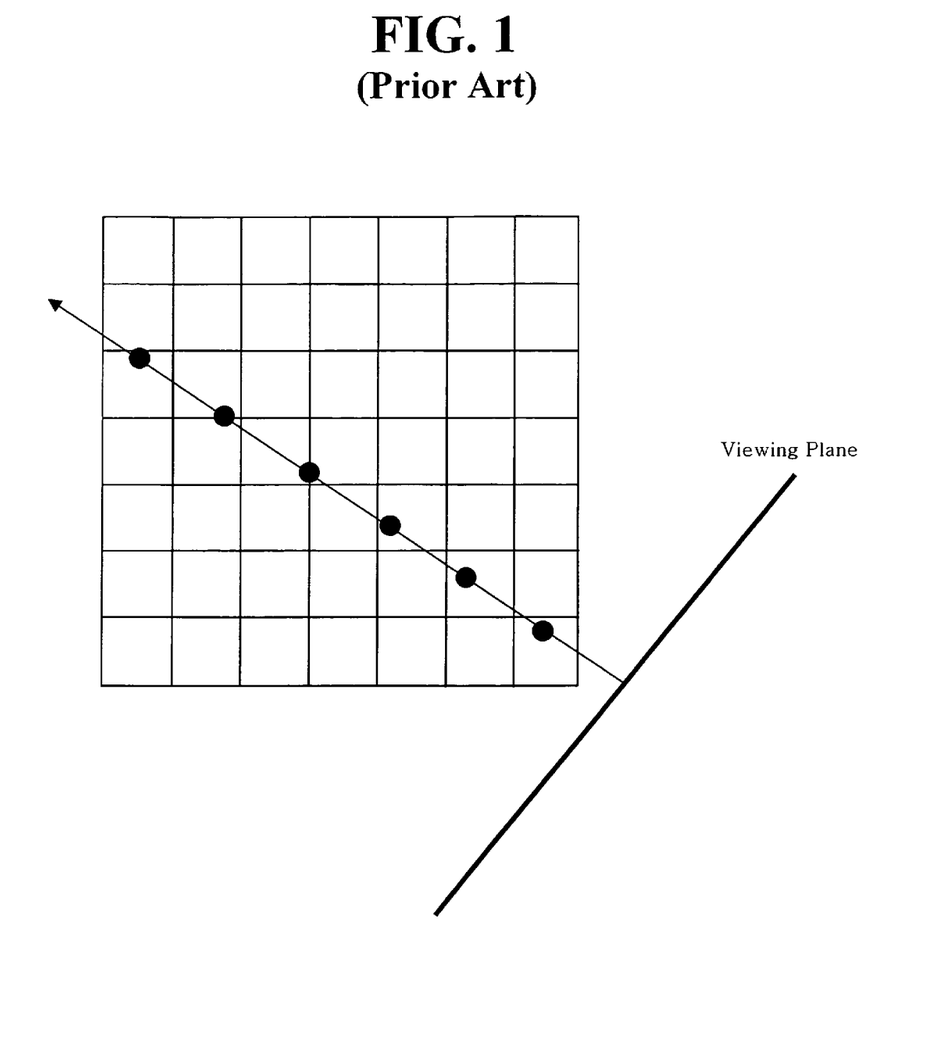
FIG. 1 is a diagram showing a conventional volume ray casting.

In a volume ray casting, which is typically used for volume sampling, a ray is cast from each pixel of a viewing plane to a target object and samples a color value and opacity in a constant interval, as shown in FIG. 1. Thereafter, the sampled color value and opacity are formed, thereby determining the color and opacity of a specific voxel. A 3D image can be produced through repeating the above process. The opacity reflects an optical effect such as scattering and absorption of the ray.

The domain of a function used for the voxel sampling is different from that of the original 3D space. As such, it is required to quantize the sampled volume data for displaying the sampled volume data in the domain of the continuous 3D space. This quantization process is referred to as the reconstruction process.

In the volume ray casting, the number of rays to be cast into the volume data is determined according to the desirable image resolution. Further, the volume data are uniformly sampled in a ray propagation direction. By doing so, a desirable image quality can be obtained. Also, since a tri-linear interpolation filter is used as a reconstruction filter in the volume ray casting, the volume ray casting has a good performance for orthographic and perspective projections.

However, since the volume data are sampled even for a space, which is unnecessary to form the 3D ultrasound image, in a constant interval in the conventional volume ray casting, there is a problem in that it is difficult to enhance the rendering speed. For example, in case of ultrasound data of a fetus, the skin of the fetus to be observed is separated from the lining of the uterus in a constant distance, while amniotic fluid is filled between the uterus and the fetus. The unnecessary space such as the amniotic fluid is sampled at a constant interval in the conventional volume ray casting. Thus, there is a problem in that the rendering speed becomes decreased.

Also, since the volume data are sampled at a constant sampling interval in the conventional volume ray casting, there is a problem in that objects, which are smaller than the sampling interval, can be excluded during the sampling process.

SUMMARY OF THE INVENTION

Therefore, it is an object of the present invention to provide an apparatus and a method for enhancing the rendering speed and ensuring that a minute object, which is to be sampled in volume ray casting, is included by adjusting the sampling interval in volume data.

According to one aspect of the present invention, there is provided a method for rendering volume data including an object space and an empty space acquired from ultrasound data. Such method comprises the following steps: a) casting a virtual ray from at least one pixel comprising a viewing plane into the volume data; b) sampling voxels of the volume data along the virtual ray in a first sampling interval; c) checking whether a currently sampled voxel corresponds to the object space or the empty space by using opacity based on a voxel value of a sampled voxel; d) at step c), if it is determined that the currently sampled voxel corresponds to the object space, then returning to the previously sampled voxel and sampling voxels in a second sampling interval which is shorter than the first sampling interval; e) checking whether an accumulated opacity calculated based on the sampled voxels along the virtual ray is greater than a critical value; f) at step e), if it is determined that the accumulated opacity is greater than the critical value, then completing the sampling process for the current virtual ray and calculating a rendering value by using the voxel values and the opacity of the sampled voxels; and g) repeating steps a) to f) until the sampling process for the pixels comprising the viewing plane is completed.

According to another aspect of the present invention, there is provided a method for rendering volume data including an object space and an empty space acquired from ultrasound data. Such method comprises the following steps: a) casting a first virtual ray from a first pixel within predetermined pixels of a viewing plane into the volume data; b) sampling voxels of the volume data along the first virtual ray in a first sampling interval; c) checking whether a currently sampled voxel corresponds to the object space or the empty space by using opacity based on a voxel value of the sampled voxel; d) at step c), if it is determined that the sampled voxel corresponds to the object space, then returning to a previously sampled voxel and performing a sampling process in a second sampling interval which is shorter than the first sampling interval; e) if the voxel sampled in the second sampling interval corresponds to the object space, then storing an object depth representing a distance from the viewing plane to the current sampled voxel; f) checking whether an accumulated opacity calculated from the sampled voxels along the first virtual ray is greater than a critical value; g) at step f), if it is determined that the accumulated opacity is greater than the critical value, then completing the sampling process for the first virtual ray and calculating a rendering value by using the voxel values and the opacity of sampled voxels, and if it is determined that a currently sampled voxel corresponds to the empty space before the accumulated opacity becomes greater than the critical value, then performing the sampling process from the current voxel in the first sampling interval; h) after the sampling process for the first virtual ray is completed, then performing the sampling process for a second virtual ray cast from a second pixel, which is adjacent to the first pixel of the viewing plane, in the first sampling interval; i) checking whether a voxel depth representing a distance between the viewing plane and a currently sampled voxel is deeper than the object depth stored at the previous sampling process; j) at step i), if it is determined that the voxel depth is deeper than the object depth, then returning to the previously sampled voxel and performing a sampling process in a third sampling interval to a currently sampled voxel; k) after step j), performing the sampling process in the first sampling interval along the second virtual ray; l) checking whether the accumulated opacity calculated based on the sampled voxels along the virtual ray is greater than the critical value; m) at step i), if it is determined that the accumulated opacity is greater than the critical value, then completing the sampling process for the current virtual ray and calculating the rendering value by using the voxel values and the opacity of the sampled voxels; and n) repeating steps a) to m) until the sampling process for the pixels comprising the viewing plane is completed.

According to yet another aspect of the present invention, there is provided an apparatus for rendering volume data including an object space and an empty space acquired from ultrasound data. Such apparatus comprises the following: a first casting unit for casting a virtual ray from at least one pixel comprising a viewing plane into the volume data; a first sampling unit for sampling voxels of the volume data along the virtual ray in a first sampling interval; a first checking unit for checking whether a currently sampled voxel corresponds to the object space or the empty space by using opacity based on a voxel value of a sampled voxel; a second sampling unit for returning to a previously sampled voxel and sampling voxels in a second sampling interval shorter than the first sampling interval, if it is determined that the currently sampled voxel corresponds to the object space based on a result from the first checking unit; a second checking unit for checking whether an accumulated opacity calculated based on the sampled voxels along the virtual ray is greater than a critical value; and a calculating unit for completing the sampling process for the current virtual ray and calculating a rendering value by using the voxel values and the opacity of the sampled voxels, if it is determined that the accumulated opacity is greater than the critical value based on a result from the second checking unit.

BRIEF DESCRIPTION OF THE DRAWINGS

The above and other objects and features of the present invention will become apparent from the following description of preferred embodiments provided in conjunction with the accompanying drawings, in which.

DETAILED DESCRIPTION OF THE PRESENT INVENTION

Figure 2:
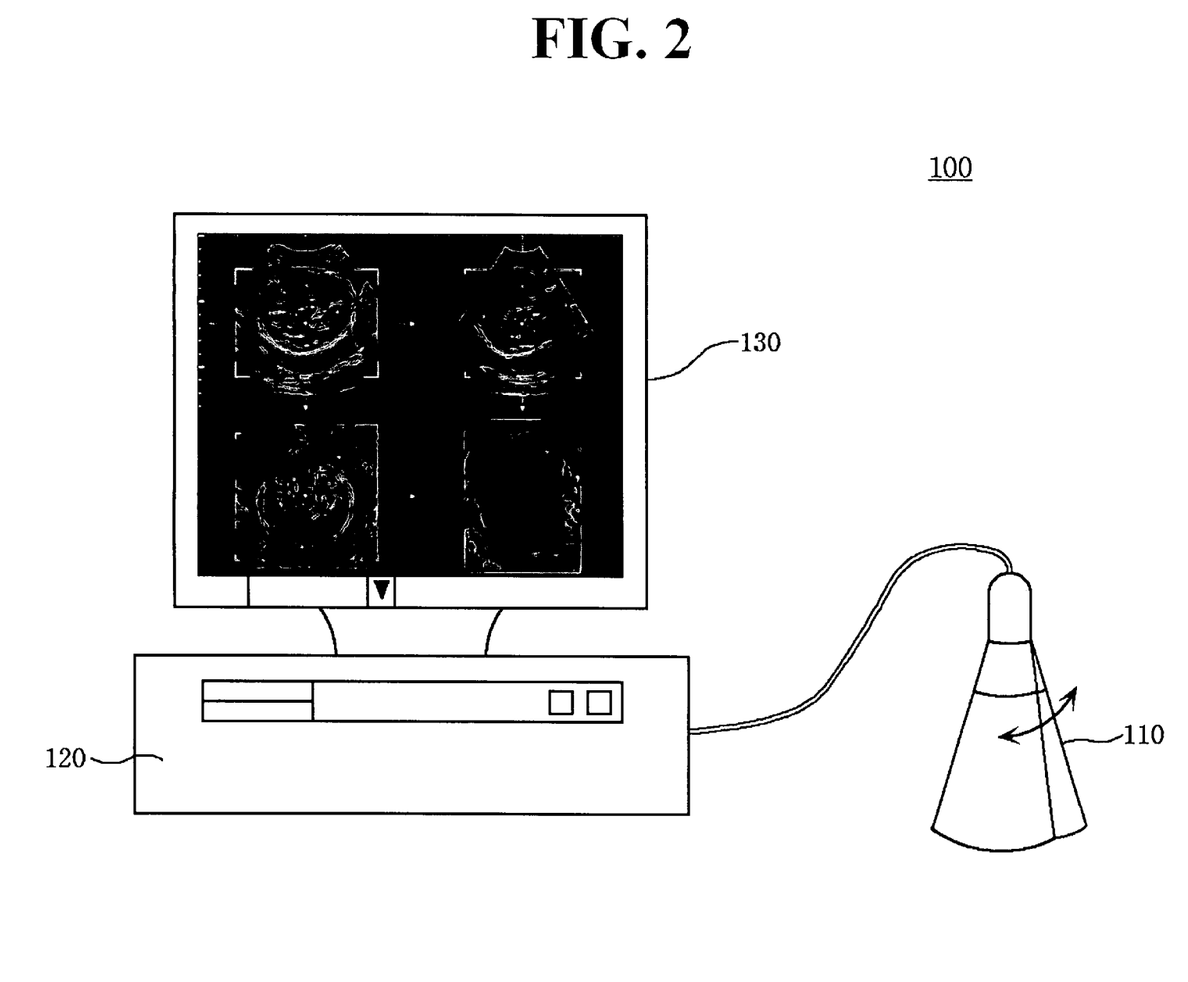
FIG. 2 is a block diagram showing an ultrasound diagnostic system in accordance with the present invention.

FIG. 2 is a block diagram showing an ultrasound diagnostic system, which is constructed in accordance with the present invention.

As shown in FIG. 2, a 3D ultrasound diagnostic system 100 includes a probe 110, a body 120 and a display unit 130.

The probe 110 is used to acquire 3D ultrasound data from a target object to be displayed. A mechanical scanning process (scan by moving a mechanical arm or rotating a stepping motor) or a hand-free process (scan by a user's hand) may be applied to the probe 110.

The display device 130 (e.g., a monitor) is used to display the ultrasound data acquired from the probe 110. It should be noted herein that as long as the display device can display a 3D ultrasound image in accordance with the present invention, any type of display device may be used.

Figure 3:
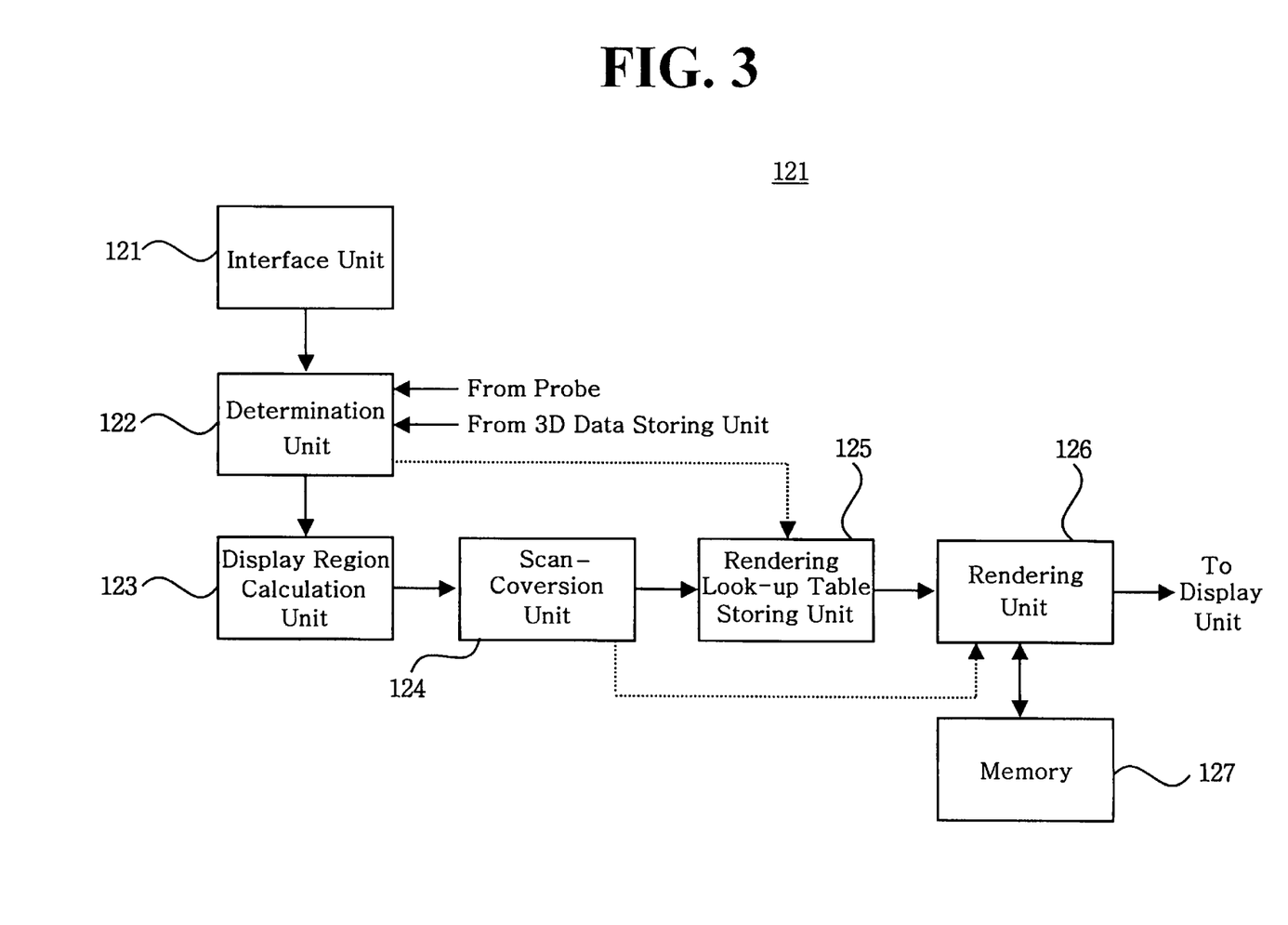
FIG. 3 is a block diagram showing the body of an ultrasound diagnostic system in accordance with the present invention.

As shown in FIG. 3, the body 120 comprises the following: an interface unit 121; a determination unit 122; a display region calculation unit 123; a scan conversion unit 124; a rendering look-up table storage unit 125; a rendering unit 126; and a memory 127.

The determination unit 122, the display region calculation unit 123 and the rendering unit 126 may be embodied by a single processor. Also, the rendering look-up table storage unit 125 and the memory 127 may be embodied by one storage unit.

The interface unit 121 transfers view operation commands for setting volume of interest (VOI) in the target object to be displayed. It also sets the position of the view and edits an image to the determination unit 122.

The determination unit 122 determines whether the 3D data are received from the probe 110 or a 3D data storage unit (not shown) based on the view operation commands received from the interface unit 121. That is, if a request for scanning the target object by continuously moving the probe 110 is inputted, then the 3D data of the target object are received from the probe 110. On the contrary, if a virtual scan using data, which are previously stored in the 3D data storage unit, is requested, then the 3D data of the target object are received from the 3D data storage unit. In this case, the 3D data of the target object are represented as conical coordinates.

The display region calculation unit 123 calculates the Cartesian coordinates of a display region on the display unit 130 for displaying the 3D data received from the determination unit 122. It also can transmit the calculated Cartesian coordinates and the 3D data to the scan conversion unit 124.

The scan conversion unit 124 receives the 3D data of the conical coordinates and the Cartesian coordinates calculated in the display region calculation unit 123. Thereafter, the scan conversion unit 124 sets indices matched with the Cartesian coordinates and calculates the conical coordinates corresponding to the indices. It then converts the 3D data of the conical coordinates into 3D data of the Cartesian coordinates based on the indices matched with the Cartesian coordinates and the calculated conical coordinates.

The rendering look-up table storing unit 125 stores the 3D data of the Cartesian coordinates, the indices and the conical coordinates corresponding to the indices, which are transmitted from the scan conversion unit 124. The data stored in the rendering look-up storing unit 125 are used when the display region displaying the current 3D data is not different from the display region displaying the previous 3D data. That is, if the display region is not changed, then it is not required to pass the display region calculation unit 123 and the scan conversion unit 124. This is because the data stored in the rendering look-up table storing unit 125 are used. Therefore, the data processing speed of the ultrasound data can be improved.

The rendering unit 126 is configured to render the 3D data received from the rendering look-up table storing unit 125.

Figure 4:
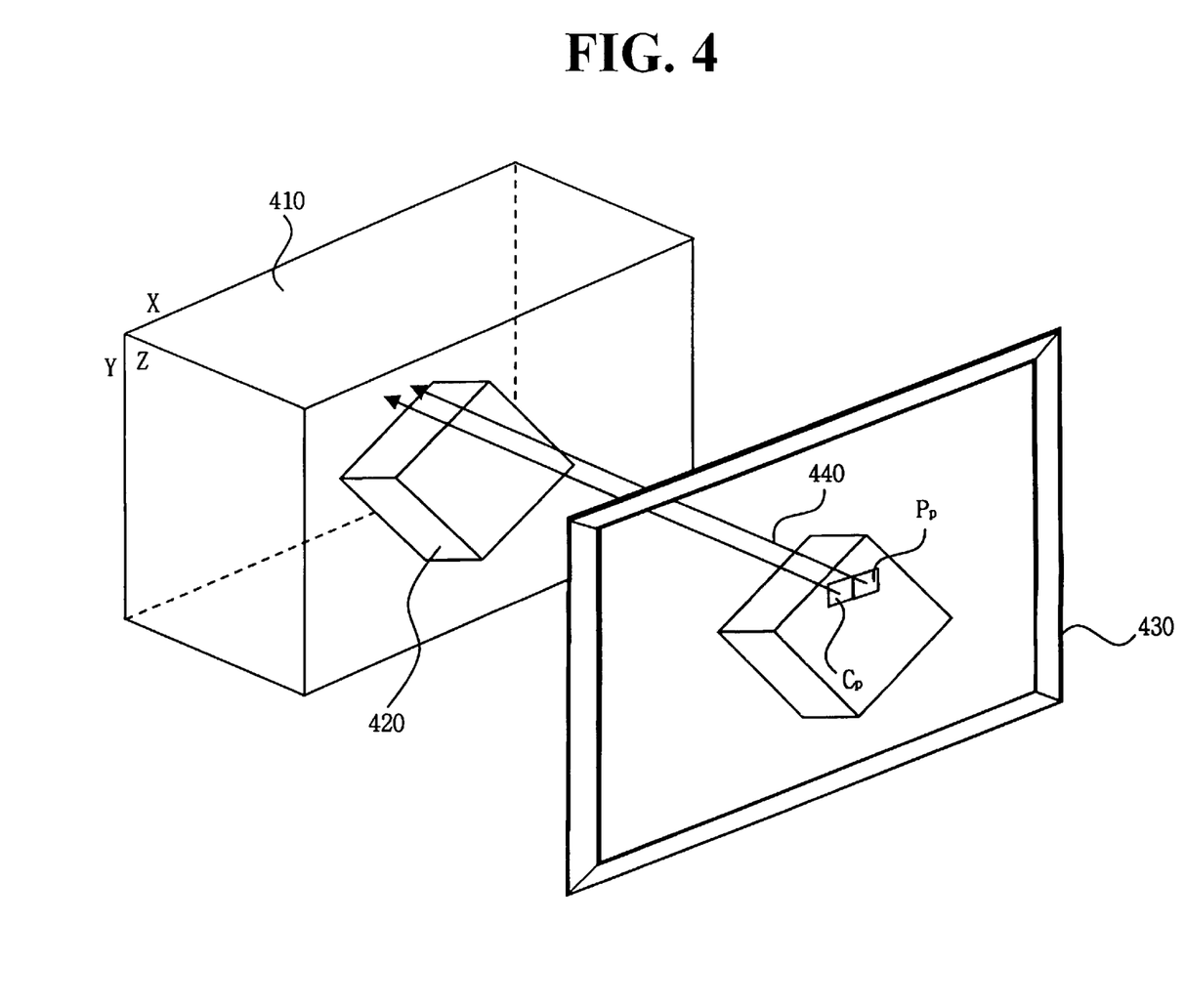
FIG. 4 is a schematic diagram showing a ray casting in accordance with the present invention.

FIG. 4 is a schematic diagram that shows a ray casting, which is in accordance with the present invention.

As shown in FIG. 4, a virtual ray 440 is cast into volume data 420 existing in a volume space 410 from a predetermined pixel of a viewing plane 430, wherein the viewing plane 430 comprises a plurality of pixels.

The viewing plane 430 corresponds to the screen of a display unit displaying a 3-dimensional ultrasound image. Further, the volume space 410 represents a space expanding viewing plane 430 into a 3-dimensional space. The volume data 420 are positioned at the volume space 410 according to the scan conversion and are divided into an object region 421 to be displayed as an image and an empty space 422, which is not to be displayed as an image.

Figure 5:
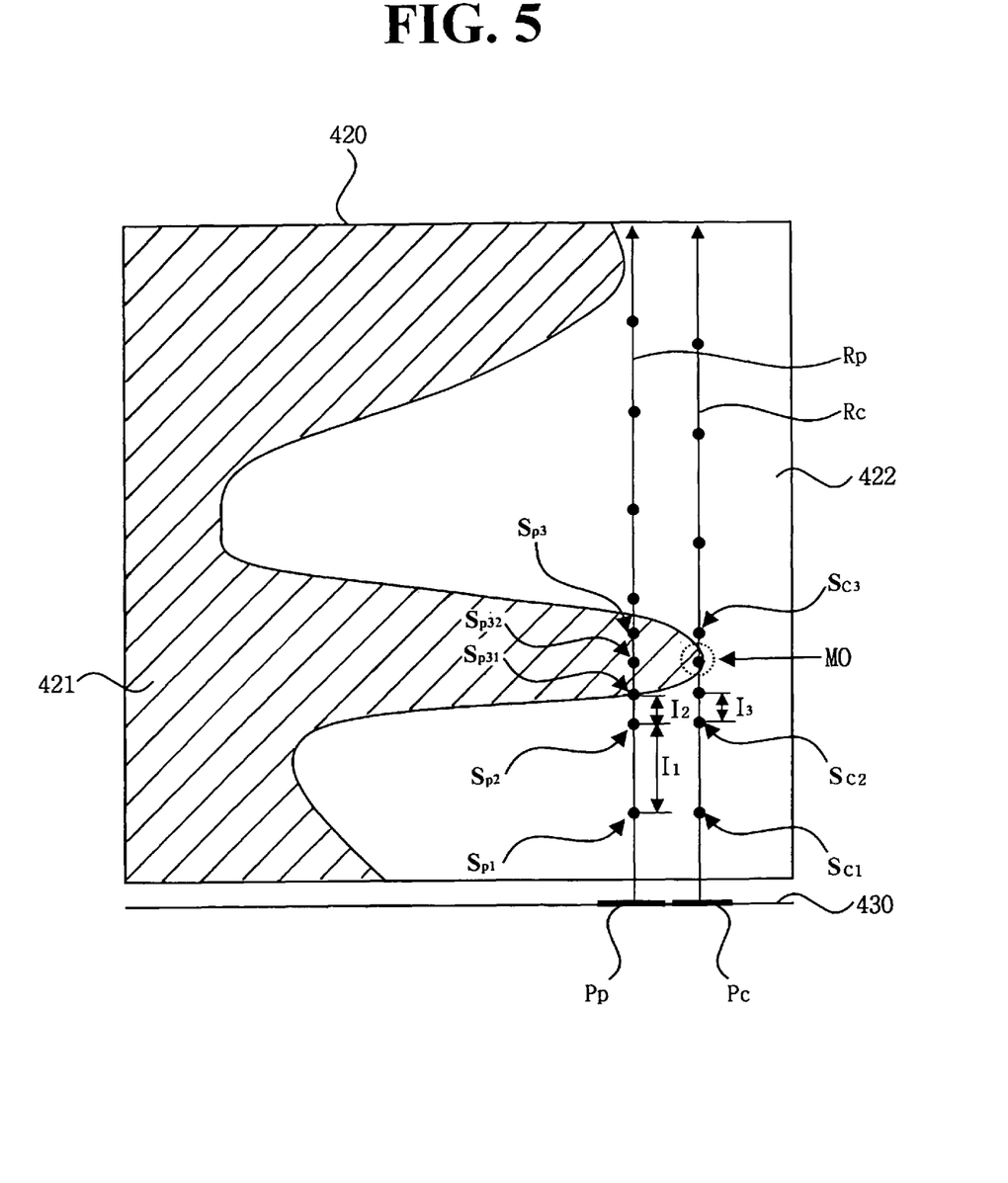
FIG. 5 is a schematic diagram showing an example of the sampling process in a ray casting in accordance with the present invention.

FIG. 5 is a schematic diagram illustrating an example of the sampling process in the ray casting of the present invention.

The dashed region corresponds to the object space 421, while the blank region corresponds to the empty space 422. A first virtual ray Rp is cast from a first pixel Pp, which is in the viewing plane 430. The sampling process is first carried out in a first sampling interval I1 along the first virtual ray Rp. This is so that pixels Sp1, Sp2 and Sp3 are sequentially sampled. The first sampling interval I1 is set to be longer than the unit sampling interval, which is in accordance with the present invention.

Figure 6:
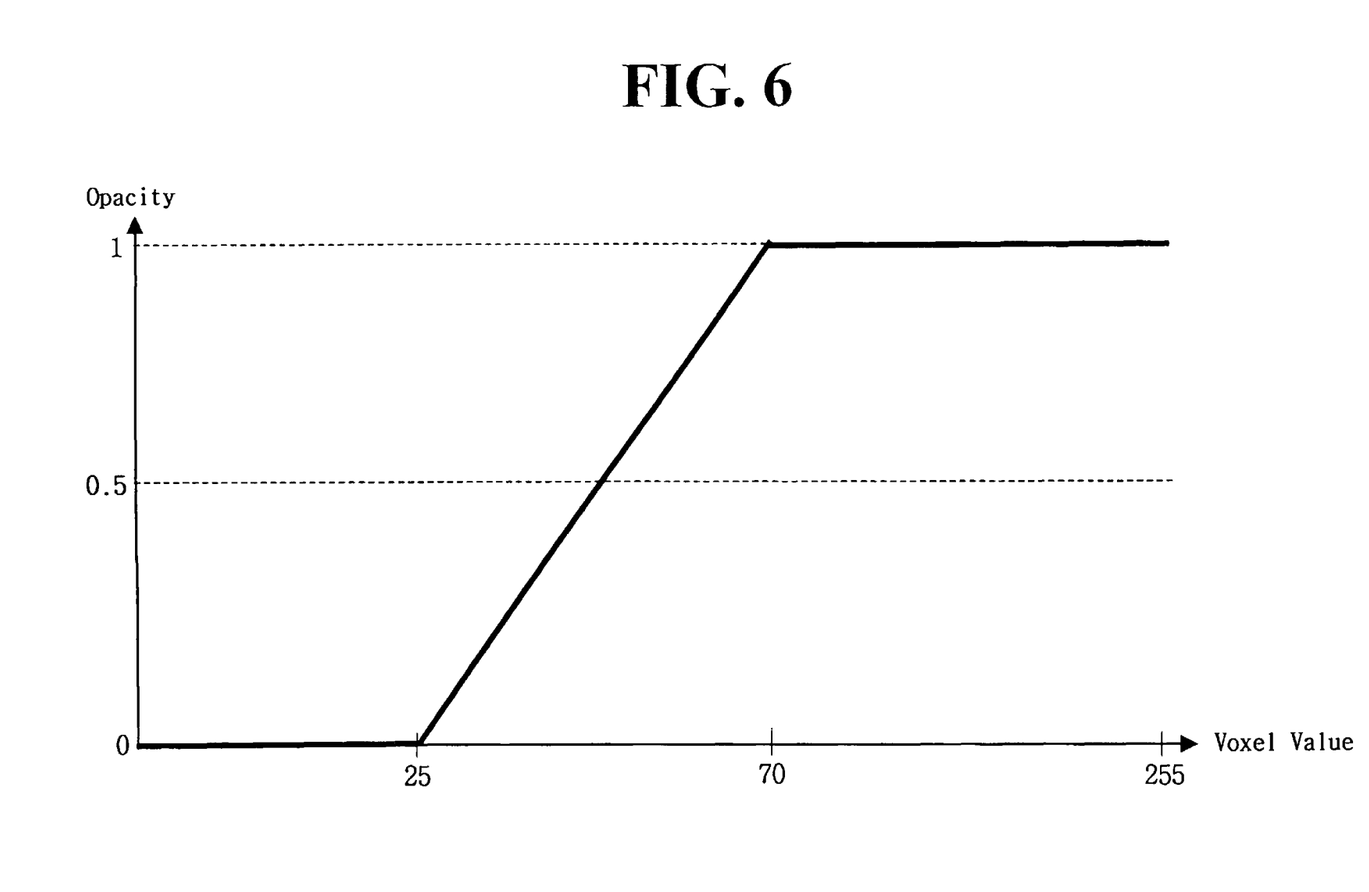
FIG. 6 is a graph showing the transfer function in accordance with the present invention.

Consequently, the opacity of each sampled pixel is computed by using an opacity transfer function based on the sampled pixel value. The opacity transfer function is a function assigning opacity according to the pixel value of the sampled pixel. If the sampled pixel value is within a range of 0 to 25, then the opacity is assigned to 0. If the sampled pixel value is within a range of 25 to 70, then the opacity is linearly assigned within 0 to 1. Further, if the sampled pixel value is within a range of 70 to 255, then the opacity is assigned to 1, as shown in FIG. 6. In accordance with the present invention, regions having the opacity of 0 are considered as an empty space, while regions having the opacity of greater than 0 are considered as an object space.

If a pixel corresponding to the object space such as the pixel Sp3 is found, then the sampling process returns to the previous sampled pixel Sp2. Then, the sampling process is carried out in a second sampling interval I2. The second sampling interval I2 is set to be shorter than the first sampling interval I1. In the present invention, the second sampling interval I2 is set to the unit sampling interval.

Thereafter, it is checked whether each pixel, which is sampled in the second sampling interval I2, corresponds to the object space. If it is determined that the pixel Sp31 corresponds to the object space, then information related to a distance between the viewing plane 430 and the pixel Sp31 (hereinafter referred to as an object depth, Do) are stored in the memory 127. The sampling process is carried out with the second sampling interval I2 until a pixel corresponding to the empty space is found or the accumulated opacity of the sampled pixels exceeds a critical value. The accumulated opacity (R) is computed by the following equation:

$$R = (1-A_1)(1-A_2)\ldots(1-A_{n-1}) \quad (1)$$

Wherein, R represents the accumulated opacity and $A_{n-1}$ represents the opacity of a $(n-1)^{th}$ sampled pixel. When the accumulated opacity of the sampled pixels is equal to or greater than the critical value, it is considered that the first ray Rp is completely absorbed into the object space. Therefore, the sampling process for the first virtual ray Rp is completed. Then, a rendering volume density (D, hereinafter referred to as the rendering value), which is obtained along the first virtual ray Rp cast from the pixel Pp of the viewing plane 430, is calculated by using the accumulated opacity. The rendering value (D) is computed by using the following equation:

$$D = C_1A_1 + C_2A_2(1-A_1) + \ldots + C_nA_n(1-A_1)(1-A_2)\ldots(1-A_{n-1}) \quad (2)$$

Wherein, $C_n$ and $A_n$ represent the pixel value and the opacity of an $n^{th}$ pixel, respectively.

After storing the rendering value in the memory unit 127, the sampling process is carried out for the second virtual ray Rc.

Further, if a pixel Spn corresponding to the empty space is found before the accumulated opacity reaches the critical value, then the sampling process is continuously carried out from a pixel corresponding to the empty space in the first sampling interval I1 until the first ray Rp meets a pixel corresponding to the object space. When a pixel corresponding to the object space is found, the above process is carried out. The sampling process, which is carried out along the first virtual ray Rp, is completed when the accumulated opacity becomes greater than the critical value or the sampled pixel corresponds to the end of the volume data.

After the sampling process, which is carried out along the first virtual ray Rp, is completed, the sampling process is continuously carried out along the second virtual ray Rc cast from a second pixel Pc of the viewing plane 430. First, the sampling process is carried out in the first sampling interval I1 in the same manner as the sampling process performed along the first virtual ray Rp. If it is determined that the sampled pixel, for example, a pixel Sc1 corresponds to the empty space 422 in the sampling process, then the distance between the viewing plane 430 and the pixel Sc1 (hereinafter referred to as the pixel depth, Dp) is compared with the object distance. The object distance is calculated at the previous sampling process, which is carried out along the first virtual ray Rp. If the difference between the pixel depth Dp and the object depth Do (Dp-Do) is a negative value, then the sampling process continues to sample the next pixel Sc2 in the first sampling interval I1. Also, if the pixel Sc2 is the empty space, then the pixel depth Dp, which corresponds to the distance to the pixel Sc2, is compared with the object depth Do calculated in the previous sampling process.

When a pixel Sc3, which corresponds to the empty space, is sampled, the difference between the pixel depth Dp and the object depth Do (Dp-Do) is a positive value. The difference is compared with a predetermined value, which may be set according to the types of images and the like. If the difference is greater than the predetermined value, then it is considered that a minute object exists between the pixel Sc2 and Sc3. Therefore, the sampling process returns to the previous sampled pixel Sc2 and then the sampling process is carried out in a third sampling interval I3.

The third sampling interval I3 should be set so as to be shorter than the first sampling interval I1 or may be set so as to be equal to the second sampling interval I2. The sampling process, which is carried out in the third sampling interval I3, continues to the pixel Sc3. After sampling the pixel Sc3, the sampling process is again carried out in the first sampling interval I1. When the sampling process is completed, the rendering value (D) is calculated by using the opacity obtained from the sampling process, which is carried out along the second virtual ray Rc. The rendering value (D) is stored in the memory unit 127.

Thereafter, it is checked whether the sampling process is carried out for all of the predetermined pixels existing in the viewing plane 430. If it is determined that the sampling process is carried out for all of the predetermined pixels, then the sampling process is considered to be completed.

As discussed above, the sampling process is carried out in a relatively longer sampling interval in the empty space than the unit sampling interval in accordance with the present invention. This is so that the rendering speed for the volume data can be improved. Also, since the sampling process is carried out in the unit sampling interval in the object space, it prevents minute objects from being missed during the sampling process While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. A method for rendering volume data including an object space and an empty space acquired from ultrasound data in an ultrasound diagnostic system having a rendering unit, comprising:
   a) using the rendering unit to cast a virtual ray from at least one pixel in a viewing plane into the volume data;
   b) using the rendering unit to sample voxels of the volume data along the virtual ray at a first sampling interval;
   c) using the rendering unit to check whether a currently sampled voxel corresponds to the object space or the empty space by using opacity based on a voxel value of a sampled voxel;
   d) at step c), if it is determined that the currently sampled voxel corresponds to the object space, then using the rendering unit to return to the previously sampled voxel and sampling voxels along the virtual ray at a second sampling interval shorter than the first sampling interval;
   e) using the rendering unit to check whether an accumulated opacity calculated based on the sampled voxels along the virtual ray is greater than a critical value;
   f) at step e), if it is determined that the accumulated opacity is greater than the critical value, then using the rendering unit to complete the sampling process for the current virtual ray and calculating a rendering value by using the voxel values and the opacity of the sampled voxels; and
   g) using the rendering unit to repeat the steps a) to f) until the sampling process for the pixels comprising the viewing plane is completed.

2. The method as recited in claim 1, wherein the step f) includes using the rendering unit to perform the sampling process at the first sampling interval when a voxel corresponding to the empty space is found before the accumulated opacity becomes greater than the critical value.

3. The method as recited in claim 1, wherein the voxel value is a gray level ranging from 0 to 255.

4. The method as recited in claim 3, wherein the opacity of the sampled voxel is calculated by using a transfer function.

5. The method as recited in claim 4, wherein the accumulated opacity is calculated by using the following equation:

$$R=(1-A_1)(1-A_2)\ldots(1-A_{n-1})$$

wherein R represents the accumulated opacity and $A_{n-1}$ represents the opacity of a $(n-1)^{th}$ sampled pixel.

6. The method as recited in claim 5, wherein the rendering value is calculated by using the following equation:

$$D=C_1A_1+C_2A_2(1-A_1)+\ldots+C_nA_n(1-A_1)(1-A_2)\ldots(1-A_{n-1})$$

wherein $C_n$ and $A_n$ represent a voxel value and the opacity of an $n^{th}$ sampled voxel, respectively.

7. A method for rendering volume data including an object space and an empty space acquired from ultrasound data in an ultrasound diagnostic system having a rendering unit and a storage unit, comprising:
   a) using the rendering unit to cast a first virtual ray from a first pixel within predetermined pixels of a viewing plane into the volume data;
   b) using the rendering unit to sample voxels of the volume data along the first virtual ray at a first sampling interval;
   c) using the rendering unit to check whether a currently sampled voxel corresponds to the object space or the empty space by using an opacity based on a voxel value of the sampled voxel;
   d) at step c), if it is determined that the sampled voxel corresponds to the object space, then using the rendering unit to return to the previously sampled voxel and performing a sampling process along the first virtual ray at a second sampling interval shorter than the first sampling interval;
   e) if a voxel currently sampled at the second sampling interval corresponds to the object space, then using the storage unit to store an object depth representing a distance from the viewing plane to the current sampled voxel;
   f) using the rendering unit to check whether an accumulated opacity calculated from the sampled voxels along the first virtual ray is greater than a critical value;
   g) at step f), if it is determined that the accumulated opacity is greater than the critical value, then using the rendering unit to complete the sampling process for the first virtual ray and calculate a rendering value by using the voxel values and the opacity of sampled voxels, and if it is determined that a currently sampled voxel corresponds to the empty space before the accumulated opacity becomes greater than a critical value, then using the rendering unit to perform the sampling process from the current voxel along the first virtual ray at the first sampling interval;
   h) after the sampling process for the first virtual ray is completed, using the rendering unit to perform the sampling process for a second virtual ray cast from a second pixel, which is adjacent to the first pixel of the viewing plane, at the first sampling interval;
   i) using the rendering unit to check whether a voxel depth representing a distance between the viewing plane and a currently sampled voxel is deeper than the object depth stored in the storage unit at a previous sampling process;
   j) at step i), if it is determined that the voxel depth is deeper than the object depth, then using the rendering unit to return to the previously sampled voxel and perform a sampling process along the second virtual ray at a third sampling interval to a currently sampled voxel;

k) after the step j), using the rendering unit to perform the sampling process at the first sampling interval along the second virtual ray;

l) using the rendering unit to check whether an accumulated opacity calculated based on the sampled voxels along the virtual ray is greater than a critical value;

m) at step i), if it is determined that the accumulated opacity is greater than the critical value, then using the rendering unit to complete the sampling process for the current virtual ray and calculate a rendering value by using the voxel values and the opacity of the sampled voxels; and n) using the rendering unit and the storage unit to repeat the steps a) to m) until the sampling process for the pixels comprising the viewing plane is completed.

8. The method as recited in claim 7, further comprising the steps of:

i1) if a voxel corresponding to the object space is sampled before the voxel depth becomes deeper than the object depth at the step i), then using the rendering unit to return to the previously sampled voxel and performing a sampling process at a second sampling interval shorter than the first sampling interval;

i2) if a voxel currently sampled at the second sampling interval corresponds to the object space, then using the storage unit to store an object depth representing a distance from the viewing plane to the current sampled voxel;

i3) using the rendering unit to check whether an accumulated opacity calculated from the sampled voxels along the second virtual ray is greater than a critical value; and i4) at step f), if it is determined that the accumulated opacity is greater than the critical value, then using the rendering unit to complete the sampling process for the second virtual ray and calculate a rendering value by using the voxel values and the opacity of sampled voxels, and if it is determined that a currently sampled voxel corresponds to the empty space before the accumulated opacity becomes greater than a critical value, then using the rendering unit to perform the sampling process from the current voxel at the first sampling interval.

9. The method as recited in claim 8, wherein the voxel value is a gray level ranging from 0 to 255.

10. The method as recited in claim 9, wherein the opacity of the sampled voxel is calculated by using a transfer function.

11. The method as recited in claim 10, wherein the accumulated opacity is calculated by using the following equation:

$$R=(1-A_1)(1-A_2)\ldots(1-A_{n-1})$$

wherein R represents the accumulated opacity and $A_{n-1}$ represents the opacity of a $(n-1)^{th}$ sampled pixel.

12. The method as recited in claim 11, wherein the rendering value is calculated by using the following equation:

$$D=C_1A_1+C_2A_2(1-A_1)+\ldots+C_nA_n(1-A_1)(1-A_2)\ldots(1-A_{n-1})$$

wherein $C_n$ and $A_n$ represent a voxel value and the opacity of an $n^{th}$ sampled voxel, respectively.

13. An apparatus for rendering volume data including an object space and an empty space acquired from ultrasound data, comprising:

a first casting unit for casting a virtual ray from at least one pixel in a viewing plane into the volume data;

a first sampling unit for sampling voxels of the volume data along the virtual ray at a first sampling interval;

a first checking unit for checking whether a currently sampled voxel corresponds to the object space or the empty space by using opacity based on a voxel value of a sampled voxel;

a second sampling unit for returning to the previously sampled voxel and sampling voxels along the virtual ray at a second sampling interval shorter than the first sampling interval, if it is determined that the currently sampled voxel corresponds to the object space from a result in the first checking unit;

a second checking unit for checking whether an accumulated opacity calculated based on the sampled voxels along the virtual ray is greater than a critical value; and a calculating unit for completing the sampling process for the current virtual ray and calculating a rendering value by using the voxel values and the opacity of the sampled voxels, if it is determined that the accumulated opacity is greater than the critical value from a result in the second checking unit.

14. The apparatus as recited in claim 13, further comprising a third sampling unit for performing the sampling process along the virtual ray at the first sampling interval when a voxel corresponding to the empty space is found before the accumulated opacity becomes greater than the critical value.

15. The apparatus as recited in claim 13, wherein the voxel value is a gray level ranging from 0 to 255.

16. The apparatus as recited in claim 15, wherein the opacity of the sampled voxel is calculated by using a transfer function.

17. The apparatus as recited in claim 16, wherein the accumulated opacity is calculated by using the following equation:

$$R=(1-A_1)(1-A_2)\ldots(1-A_{n-1})$$

wherein R represents the accumulated opacity and $A_{n-1}$ represents the opacity of a $(n-1)^{th}$ sampled pixel.

18. The apparatus as recited in claim 17, wherein the rendering value is calculated by using the following equation:

$$D=C_1A_1+C_2A_2(1-A_1)+\ldots+C_nA_n(1-A_1)(1-A_2)\ldots(1-A_{n-1})$$

wherein $C_n$ and $A_n$ represent a voxel value and the opacity of an $n^{th}$ sampled voxel, respectively.

* * * * *